R. H. RICHARDSON.
SHUTTER.
APPLICATION FILED MAR. 21, 1919.
1,363,672. Patented Dec. 28, 1920.
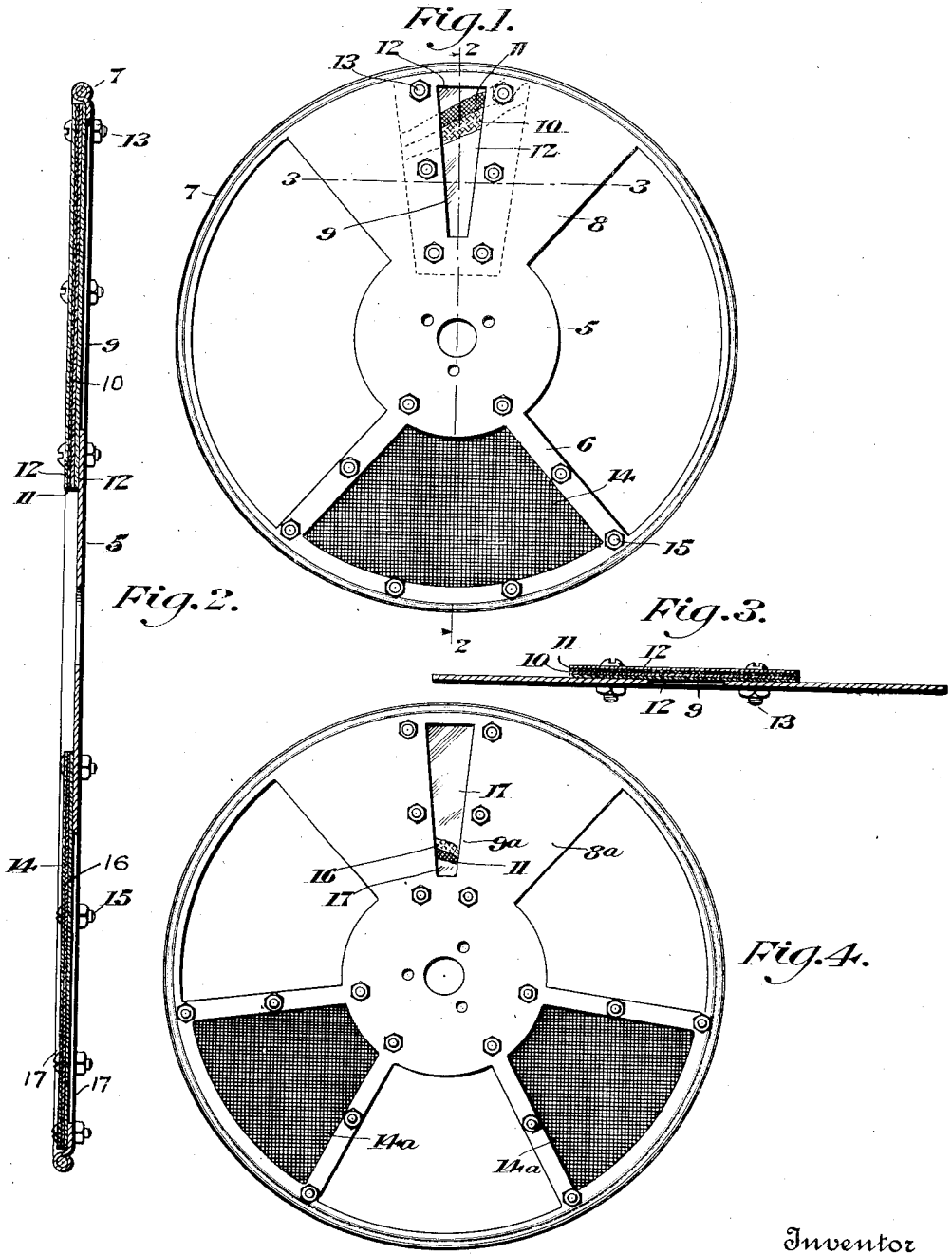

UNITED STATES PATENT OFFICE.

ROBERT H. RICHARDSON, OF RICHMOND, VIRGINIA.

SHUTTER.

1,363,672.   Specification of Letters Patent.   Patented Dec. 28, 1920.

Application filed March 21, 1919. Serial No. 283,993.

*To all whom it may concern:*

Be it known that I, ROBERT H. RICHARDSON, a citizen of the United States, residing at Richmond, in the county of Henrico and State of Virginia, have invented new and useful Improvements in Shutters, of which the following is a specification.

My present invention is designed more particularly as an improvement upon the shutter for motion picture machines constituting the subject of my Letters-Patent No. 1,245,970 of November 6, 1917.

The main object of the present invention is to provide a revoluble shutter adapted to permit the passage of a bright, though not white, light for a brief period and a subdued light for a comparatively long period, incidental to its movement through a complete revolution, with a view to intensifying the photography in the projected pictures on a screen.

Another object is the provision of a revoluble shutter characterized as stated, or with opaque, interrupting blades in which it is feasible to make the light-intercepting blade comparatively wide to adapt it for use on machines having slow intermittent film movements such as a ratio of 4 to 1 or 5 to 1.

Another object is to improve or refine the color or tint tone of the transparent portions of the interrupting blades by including in the color a little blue to afford a pearl gray tint that is not so dull and dingy as the plain blackish-gray tint alluded to in my patent aforesaid. It is, however, within the purview of my present invention to make said transparent portions of French gray, sepia, lavender, rose, lilac and other tints to tone the picture as occasion demands, though it is to be understood that the shutter is not designed for coloring pictures.

Other objects and practical advantages of the invention will be developed in the following detailed description of the best practical embodiment of my invention that I have as yet devised, the said description and my appended claims to be considered in connection with the accompanying drawings, forming part hereof, in which—

Figure 1 is an elevation of an alternating current shutter constructed in accordance with the present invention.

Fig. 2 is a diametrical section of the same.

Fig. 3 is an enlarged section at right angles to Fig. 2, and in the plane indicated by the line 3—3 of Fig. 1.

Fig. 4 is an elevation of a direct current shutter constructed in accordance with my present invention.

Similar numerals designate corresponding parts in Figs. 1 to 3, to which reference will first be had.

In common with the shutter of my aforesaid patent, my improved shutter comprises a center disk 5, radial spokes 6 and a rim 7, the whole being preferably stamped or cut from a single blank, though it may be made in any other manner. The shutter is also provided intermediate the center disk and the rim with a sector-shaped opaque portion 8, which is of about the proportional width illustrated.

In the preferred embodiment of my invention, the said opaque portion 8 is provided with a narrow opening 9, which opening is controlled by a colored sheet 10, preferably of gelatin interposed together with a layer 11 of fine wire mesh fabric, between two sheets 12 of celluloid or other suitable transparent material, and all of the several layers being connected together and to the imperforate portion 8 by bolts 13 or other suitable means.

Controlling the opening between the center disk 5, spokes 6 and rim 7 of the shutter body is a transparent panel 14 which is connected thereto through the medium of bolts 15 or other suitable means. The said transparent panel may be and preferably is composed of a sheet of gelatin 16 interposed between two sheets 17 of celluloid or other suitable transparent material.

In the embodiment shown in Fig. 4, two panles 14$^a$ similar to the panel 14 of Figs. 1 to 3 are employed to form interrupting blades, and the same shutter comprises an intercepting blade made up of an opaque portion 8$^a$ similar to the opaque portion 8 of Figs. 1 to 3, and forming an intercepting blade; the said opaque portion 8$^a$ being provided with a narrow opening 9$^a$ similar to the narrow opening 9 of Figs. 1 to 3 and controlled by a panel composed, by preference, of a sheet 16 of colored gelatin interposed with a section of mesh 11 between transparent sheets 17 of celluloid or other suitable material, and the whole connected by bolts or other suitable means to the opaque portion.

In both embodiments of my invention the fine wire mesh serves the usual purpose—i. e., provides for a more equal diffusion of light during the so-called "shadow period," and prevents the formation of an image upon the screen, but without totally cutting off all of the rays of light.

By virtue of the provision of the narrow opening in the opaque portion of each intercepting blade, the said narrow opening being controlled by a transparent modifier of bright color such as will stand out, strike through and be sharp and contrasting and conspicuous alongside the black of the opaque portions, it will be observed that during the revolutions of the shutter the passage of a bright light will be permitted for a brief period, and in that way the light in the projected pictures on a screen will be better flicker-balanced, particularly when a subdued light is permitted to pass through the interrupting blades for a comparatively long period during each revolution. Any color may be employed for the controlling modifier of the narrow opening in the intercepting blade. The lighter and brighter the color, the better, as the passage of light will then be vivid and noticeable. For instance said controlling modifier may be yellow, golden and orange, as desirable.

The width of the narrow opening in the intercepting blade is determined by the width of the opaque portions at the sides of the opening, said opaque portions being sufficiently wide to produce enough darkness to shade the screen before and after exposure of the color flash through the opening. This depends upon the size or diameter of the lens and the intermittent film speed. Consequently the negative or blurred out of focus light is prevented from mixing in or otherwise disturbing the positive or in focus light. The effect of the flash is to relieve the long shadow duration and give to the eye of an observer the sensation of partial illumination of the intercepting portion of the shutter, thereby providing a more or less complete balance or rather counter-balance to the flash or modified flash of illumination that passes through the interrupting blades, with the result that the illusion serves to soften and relieve and eliminate flickering and eye strain attendant thereupon. The said color flash does not and is not intended to color the pictures, but in this connection I would say that the red in any reddish tint color that is used seems to have an effect in some cases with certain films of sharpening and giving snap and added brilliancy to the light in the pictures. I would also say that orange has been found by me to be an ideal tint for the color flash, as it is not as hard on the eyes as some other tints.

The transparent panel or panels in the interrupting blade or blades serve for the passage of subdued light for a comparatively long period during a revolution of the shutter, and in that way contribute to intensifying the photography in the pictures projected on a screen, while eliminating eye strain to a large extent.

The transparent panel or panels of the shutter may be, if desirable, tinged with a little blue to give them a pearl gray tint instead of a dully and dingy tint as when they are blackish gray. I would also have it understood that the said transparent panels may be of any suitable tint compatible with the purpose of my invention, as before indicated.

Wherever employed in my novel shutter, the transparent material may be of any character compatible with the purpose of the shutter, such as celluloid, gelatin, glass or mica.

It will be apparent from the foregoing that in addition to the practical advantages of the shutter of my prior patent, the present shutter is, by reason of its characteristics, calculated to intensify the photography in the projected pictures on a screen without being hard on the eyes of the observer; the provision herein being intended to soften the projection on the screen and to eliminate flickering.

With respect to the intercepting blade, it is to be understood that the portions opaque to the passage of light, at opposite sides of the portion transpicuous to the passage of light but opaque to picture projection, are each of an area in comparison with the diameter of the lens employed to entirely cut off the passage of light. This is materially advantageous, inasmuch as it assures equalization in the illumination of the screen—i. e., prevents too sharp a contrast between the period when the intercepting blade is in front of the lens, and the period when the remainder of the shutter is in front of the lens.

Having described my invention, what I claim and desire to secure by Letters-Patent, is:

1. A shutter of the character described for motion picture machines having an interrupting blade and also having an intercepting blade with an opening centered therein, said opening controlled by translucent means including a light colored transparent sheet and wire-mesh fabric to produce a vivid effect of partial illumination to balance the subdued light provided by the interrupting blade, and said controlled opening being sufficiently narrow to enable the opaque portions at the sides thereof to properly shade the screen before and after the colored flash through said controlled opening in order that "mixing-in" of the positive and negative lights may be prevented.

2. A shutter of the character described for motion picture machines having an interrupting blade and also having an intercepting blade with an opening centered therein, said opening controlled by a translucent panel including a bright colored transparent sheet and wire-mesh fabric to produce a vivid effect of partial illumination to balance the subdued light provided by the interrupting blade, and said paneled opening being sufficiently narrow to enable the opaque portions at the sides thereof to properly shade the screen before and after the colored flash through said panel that "mixing-in" of the positive and negative lights may be prevented.

3. A shutter of the character described for motion picture machines having an interrupting blade including means for the passage therethrough of subdued gray light and also having an intercepting blade with an opening centered therein, said opening controlled by translucent means including a bright light colored transparent sheet and wire-mesh fabric to produce a vivid effect of partial illumination to balance the subdued gray light provided by the interrupting blade, and said controlled opening being sufficiently narrow to enable the opaque portions at the sides thereof to properly shade the screen before and after the colored flash through said controlled opening in order that "mixing-in" of the positive and negative lights may be prevented.

In testimony whereof I affix my signature.

ROBERT H. RICHARDSON.